Dec. 4, 1956  R. W. JENNY  2,772,415
PORTABLE STAPLING IMPLEMENT
Filed Aug. 17, 1955  5 Sheets-Sheet 1

INVENTOR:
Robert W. Jenny
BY
ATTORNEYS.

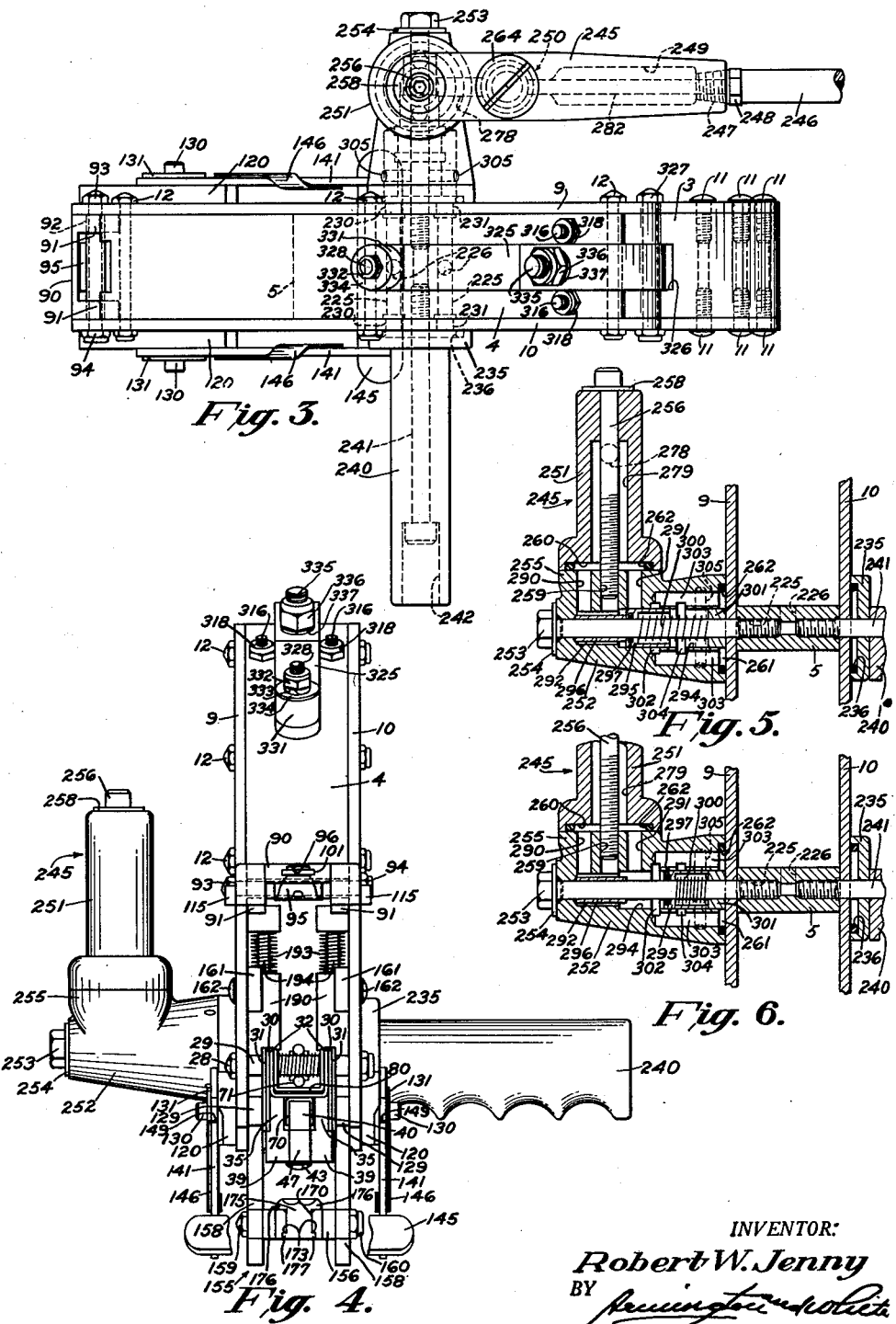

INVENTOR:
Robert W. Jenny
BY
ATTORNEYS.

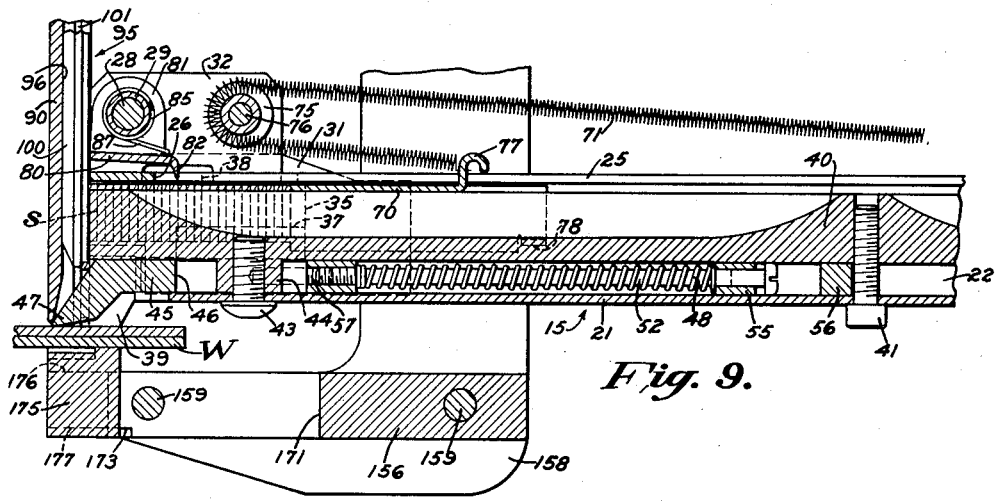
Fig. 9.
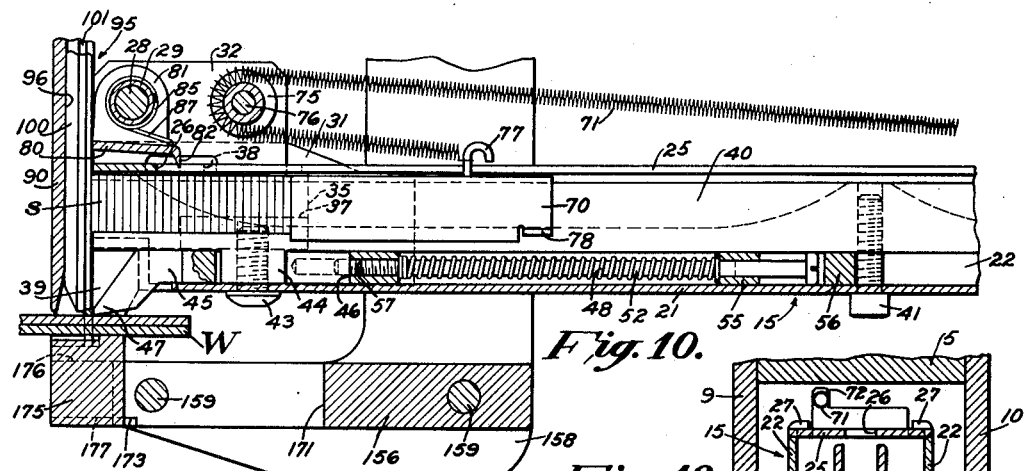
Fig. 10.
Fig. 12.
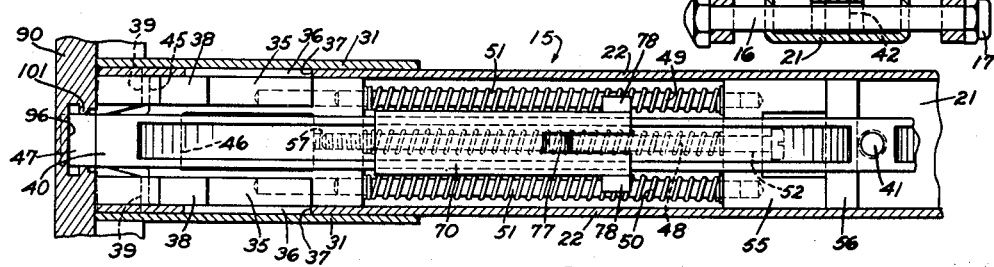
Fig. 11.
INVENTOR:
Robert W. Jenny
BY
ATTORNEYS.

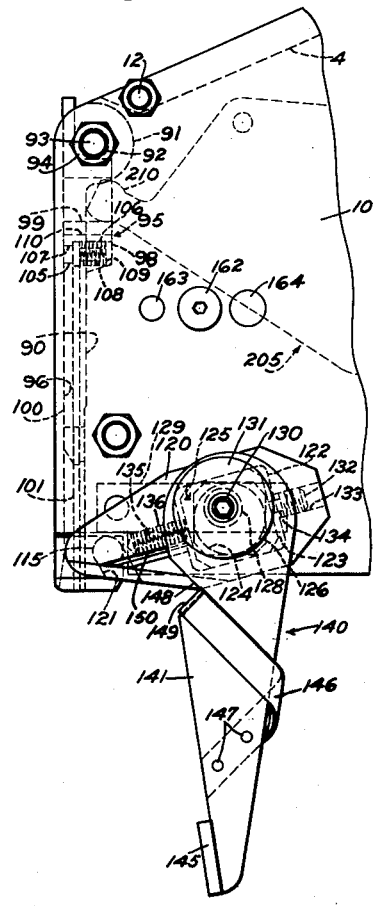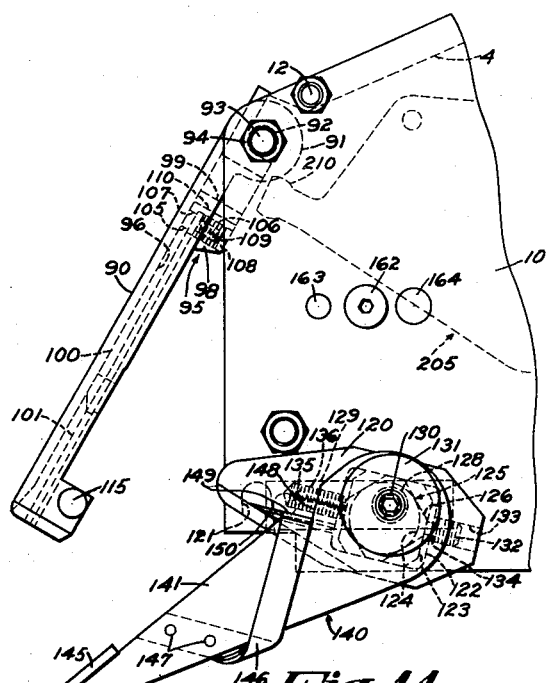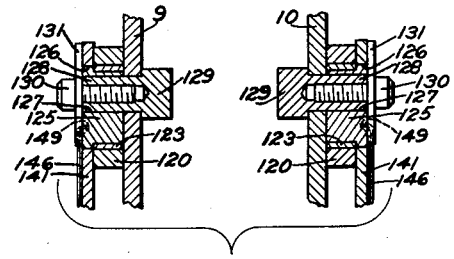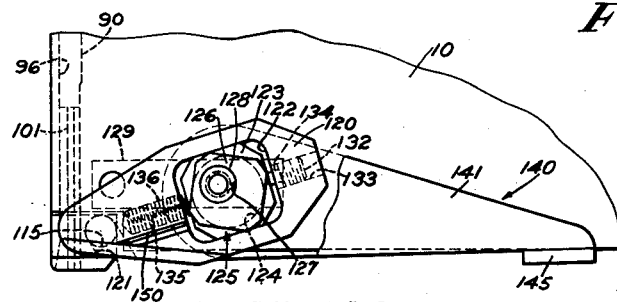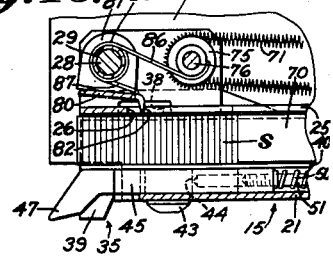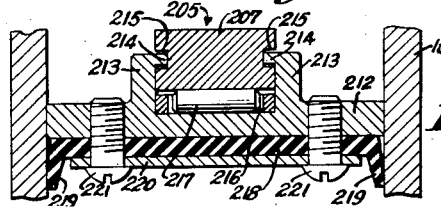

United States Patent Office 2,772,415
Patented Dec. 4, 1956

2,772,415

PORTABLE STAPLING IMPLEMENT

Robert W. Jenny, Bellevue, Wash., assignor to Bostitch, Inc., Stonington, Conn., a corporation of Rhode Island Application August 17, 1955, Serial No. 528,867

20 Claims. (Cl. 1—44.4)

This invention relates to a heavy-duty stapling machine or portable implement for fastening together metal parts or attaching fiber strips or the like to metal, and more particularly to an implement which may be held in the hands and operated by pneumatic or hydraulic pressure for driving staples through the work and clinching their legs against the underside thereof.

One object of the invention is to provide a portable stapling implement for use in connecting the structural elements of airplanes, automobile bodies and the metal parts of other structures.

A particular object of the invention is to provide a manually held, portable implement for stitching together copper, brass, aluminum, plastic, steel parts or connecting other structural materials.

Another object is to provide an implement of the type indicated for driving staples through the metal by causing the legs to punch their own holes without requiring prepunching or other preparation of the materials.

Another object is to provide an implement of the type indicated for use in attaching metal pieces or parts that require an especially tight-fitting joinder with the legs of the staples clinched to render the connection of the parts secure.

Another object is to provide an implement of the type indicated which may be conveniently held in the operator's hands, readily transported to different locations and applied to the work for driving the staples in various positions thereon.

Another object is to provide an implement of the type indicated in which the anvil for clinching the legs of the staple is drawn upwardly against the under side of the work to clamp it against a fixed abutment to firmly hold it in place and the driver actuated substantially simultaneously to drive and clinch the staples in the hard material.

Another object is to provide an implement of the type indicated having a chamber for the fluid pressure and a single movable arm or beam actuated thereby and connected to move the clinching means and driver for repeatedly applying the staples to the work.

Another object is to provide an implement of the type indicated having a magazine for containing a large supply of staples with a gate or door at the front for retaining the staples in the magazine, and means for locking said door in closed relationship while adapted for convenient release to open the gate for loading the magazine.

Another object is to provide an implement of the type indicated of relatively light weight and compact size having the operating mechanism enclosed in a casing to protect it from the insinuation of dust or foreign particles.

Another object is to provide in an implement of the type indicated, valve-means for admitting compressed air or other fluid pressure to the inner chamber with a trigger or the like adjacent one of the handles of the implement for operating said valve-means.

Another object is to provide an implement of the type indicated of strong and rugged construction with its operating mechanism designed to resist wear and so organized as to prevent dislocation or derangement of its parts.

Further objects of the improvement are set forth in the following specification which describes a preferred form of construction of the implement, by way of example, as illustrated by the accompanying drawings. In the drawings:

Fig. 3 is a top plan view of the implement showing the opposite grips or handles by which it may be held for operation;

Fig. 4 is a front elevational view of the implement shown with the door as opened;

Fig. 5 is a detailed sectional view of the pressure-control valve showing the valve closed and the exhaust open;

Fig. 6 is a similar detailed sectional view showing the air-valve open and the exhaust closed;

Fig. 9 is an enlarged part-sectional elevational view taken through the forepart of the implement and showing the staple-magazine, the staple-supporter, and the clinching anvil with the work held in place;

Fig. 10 is a similar view showing the staple-supporter retraced by the staple illustrated as driven through the work;

Fig. 11 is a longitudinal part-sectional view taken through the staple-magazine showing the resilient means for operating the staple supporter;

Fig. 12 is a vertical transverse sectional view of the staple-magazine showing the staple-core therein and the cover for the magazine;

Fig. 13 is a detailed side elevational view showing the arrangement of the door at the front of the implement with its locking means engaged;

Fig. 14 is a similar view showing the locking means released and the door swung partly open;

Fig. 15 is a similar view showing the eccentric means for operating the latch to lock the door in closed relationship;

Fig. 16 is a detailed sectional view of the means for fastening the latching or locking means to the implement;

Fig. 17 is a detailed sectional view showing the spring-operated pawl for retaining the staples from escaping from the magazine when the door is opened; and Fig. 18 is a transverse sectional view of the fluid pressure operated actuator for the movable elements of the implement showing the construction and arrangement of the parts thereof.

General organization

Figures 1, 2:
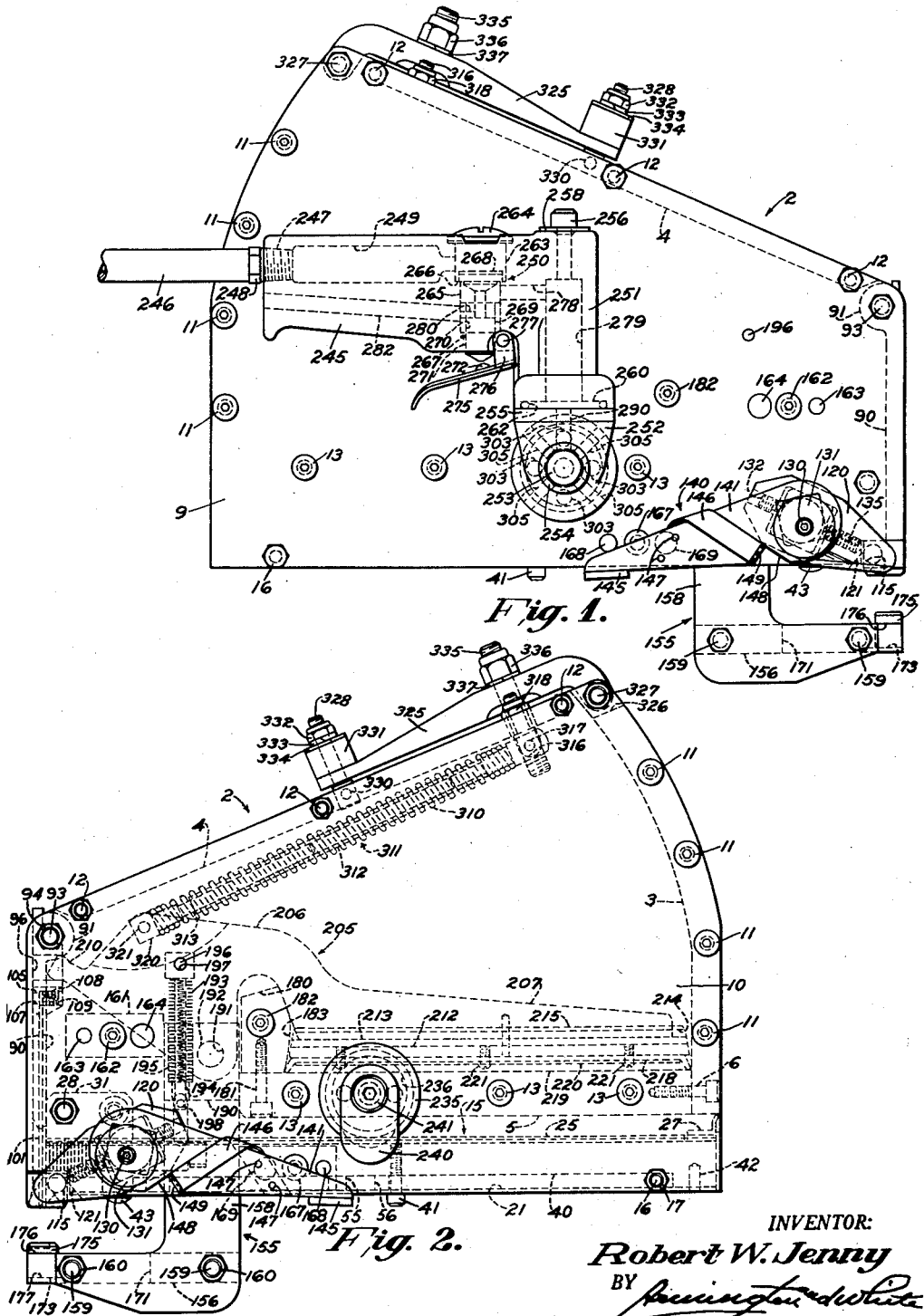
Fig. 1 is an elevational view of one side of the complete implement.
Fig. 2 is a similar elevational view of the opposite side of the implement.

In general, the present implement comprises a flat-sided casing containing the operating mechanism with a pressure-chamber therein for actuating the staple applying and clinching means. The casing is provided with grips or handles projecting from its opposite sides by means of which the implement may be held in both hands of the operator. Within the casing is a longitudinally-extending staple-magazine of more or less conventional type, the forward end of which is rendered accessible for loading it by opening a hinged door at the front. A reciprocable staple-driver is slidable in vertical ways on the door at the forward end of the casing and connected for operation by a pivoted lever or beam actuated by the pressure in the chamber at the bottom of the casing. The beam or actuator is also connected to a so-called slider mounted in guideways to depend from the bottom of the casing and carrying an anvil-holder. In the forward end of the anvil-holder is a replaceable clincher-block having grooves for clinching the legs of the staple on the under side of the work. Means are provided for connecting a flexible conduit or hose to the side of the casing adjacent one of the handles and the air or other fluid pressure is supplied thereby to enter the casing under the control of a manually-operable valve communicating with the pressure-chamber. The air-valve may be conveniently located in a part of the handle and operated by a trigger disposed therebeneath to control its feed to the pressure-chamber at the bottom of the casing.

Implement casing

The casing 2 of the implement for housing the operating parts (Figs. 1 to 4) is of substantially triangular shape in side view comprising a rearward wall 3 of relatively narrow width extending vertically and then in arcuate contour toward the top and an upper wall 4 inclined downwardly toward the front. Extending part way toward the front of the casing is a horizontal wall 5 in the nature of a baffle forming the bottom wall of the pressure-chamber as later explained. The wall 5 is fastened to the vertical portion of the rear wall 5 by means of bolts 6 shown in Figs. 2, 7 and 8. A pair of flat plates 9 and 10 are fitted against the sides of the casing and fastened to the walls 3, 4 and 5 (Figs. 1, 7 and 8) by bolts 11, 12 and 13 secured in threaded holes therein. The side plates 9 and 10 project below the wall or baffle 5 for supporting a staple-magazine 15 extending longitudinally therebetween. The rearward end of the magazine 15 is fastened to the depending portions of the side plates 9 and 10 by a bolt 16 passing through holes therein and secured by a nut 17.

Staple-magazine

The magazine 15 is constructed from sheet-metal in rectangular channel-shape (Fig. 12) with a bottom wall 21 and upstanding side walls 22. Overlying the top of the side walls 22 is a sheet-metal cover-plate 25 having a central slot 26 extending longitudinally throughout substantially its full length and adapted for a purpose later explained. The rearward end of the cover 25 is held down on the magazine 15 by means of ears 27 (Figs. 7, 8 and 12) on the side walls 22 bent inwardly to project across its top. The forward end of the magazine 15 is supported by a bolt 28 extending through a cylindrical sleeve 29 which serves as a pivotal mounting for a staple-retainer in the form of a releasable pawl to be later described. At the forward end of the magazine 15 its side walls 22 are extended upwardly in flanges 30 for mounting the bolt 28 and other parts later described. The flanges 30 are reinforced on the outside by overlying plates 31 welded thereto (Fig. 4). The forward end of the cover plate 25 also has upstanding flanges 32 similar in shape to the flanges 30 on the magazine 15 and underlying their inner sides, thus providing three laminations for the structure at the top.

Abutting the inner faces of the flanged ends of the side walls 22 of the magazine 15 are two relatively thick plates 35 having projecting keys or splines 36 which are received in longitudinal slots 37 in the side walls 22 (Fig. 11) and also have keys 38 at the top engaging through slots in the cover plate 25. The plates 35 have depending portions 39 at their forward ends which project downwardly beyond the bottom of the magazine and form the open nose through which the staples are driven.

Staple-core

Extending longitudinally within the magazine 15 is a staple-core 40 for mounting the staples $s$ to slide therealong (Fig. 12) for feeding them to the driving means. The core 40 is of solid construction along its bottom and slotted along its top to reduce weight. The rearward end of the core 40 is formed to seat against the bottom 21 of the magazine 15 and an upward projection midway of its ends is drilled and tapped to receive a screw 41 (Fig. 8) which fastens the core in place. A dowel-pin 42 projecting downwardly at the rearward end of the core 40 seats in a hole in the bottom of the magazine to further hold the core, and a screw 43 at its forward end provides for fastening the core at this point. The under side of the core 40 is cut away to reduce its weight and the screw 43 is threaded through a hole in a spacer-lug 44 projecting downwardly from its under side to seat against the bottom of the magazine.

Staple-supporter

A retractible staple-supporter 45 (Figs. 9–11) is mounted to slide on the bottom of the magazine 15 with its lateral portions underlying the plates 35 which hold it down and guide its rearward sliding movement. The staple-supporter 45 has its main portion provided with a central rectangular opening 46 for receiving the spacer-lug 44 on the under side of the staple-core 40. The staple-supporter 45 is formed at the front with a narrowed projecting portion 47 having a forward beveled face adapted to underlie the crossbar of a staple to sustain it as it feeds off the end of the core 40. The projecting sides of the main portion of the staple-supporter 45 serve as abutments engageable against the downwardly-projecting nose portions 39 of the plates 35 to limit the forward sliding motion of the supporter (Fig. 11). The staple-supporter 45 is resiliently urged forward into this position by means of a central helical spring 48 and two outer parallel springs 49 and 50 enclosing rods 51 and 52, the outer rods 51 have their ends fitted in drilled holes at the inner end of the supporter 45 and their rearward ends seated in holes in a yoke-member 55 held in the bottom of the magazine 15 with the ends of its legs abutting a cross-strip 56 welded to its bottom wall. The central rod 52 has its forward end screwed into a tapped hole 57 in the rearward end of the supporter 45 while its headed opposite end is received in a hole in the cross-member of the yoke 55. By this form of construction the staple-supporter is adapted to be forced rearwardly into the position shown in Fig. 10 as the staple descends for insertion into the work.

Staple-pusher

A staple-pusher 70 of inverted channel-shape adapted to straddle the sides of the core 40 is mounted to slide thereon for feeding the staples $s$ forwardly in the magazine to deliver them singly to the driving means. A helical spring 71 fastened to an ear 72 at the end of the cover 25 extends forwardly therefrom and is looped around a pulley 75 journaled on a pin 76 in the flanges 30, 31 and 32 at the front of the magazine. From the pulley 75 the spring 71 reaches rearwardly for attachment to a hook 77 projecting upwardly from the pusher 70 through the slot 26 in the cover member 25 for feeding the pusher forwardly. Laterally-extending ears 78 at the rearward end of the pusher 70 are adapted to engage the rearward ends of the side plates 35 to prevent the pusher from sliding beyond the end of the core 40 when the door at the front of the magazine is opened.

Staple-retaining pawl

Figures 7, 8:
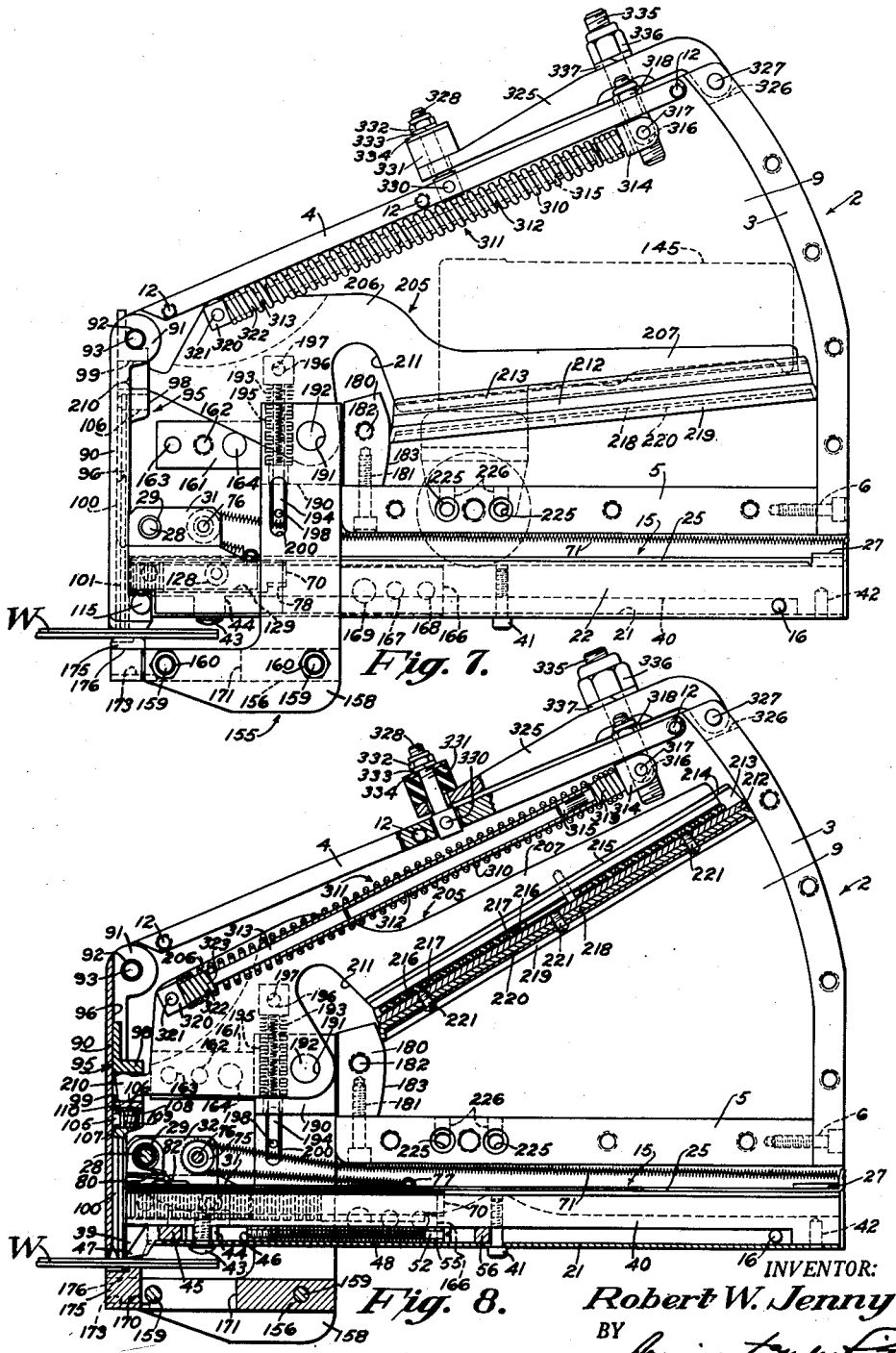
Fig. 7 is a side elevational view of the implement shown with the cover plate removed and illustrating the anvil as having been operated to grip the work to be stapled.
Fig. 8 is a similar side elevational view with the cover plate removed and illustrating certain of the parts of the mechanism in section in their relationship after the staple has been driven into the work.

A pawl 80 having spaced ears 81 pivoted on the sleeve 29 enclosing the cross pin 28 has a downwardly-projecting sharpened prong or tooth 82 at the rear of the pawl (Fig. 8) engageable between adjacent staples on the core 40 for retaining the staples in the magazine after the door has been opened. A spring 85 coiled around the sleeve 29 (Fig. 17) with its longer leg 86 hooked under the hub of the pulley 75 and its shorter leg 87 bearing against the rearward end of the pawl 80 adjacent the tooth 82 tends to rock the pawl clockwise for engaging its tooth between two of the staples s. The pawl 80 is adapted to be rocked or pivoted in the opposite direction by the engagement therewith of a door 90 as it is closed against the front of the casing 2 (Fig. 8).

Hinged door

The door 90 is of relatively heavy construction provided with spaced ears 91 at the top for receiving a sleeve or bushing 92 surrounding a bolt 93 extending through holes in the side plates 9 and 10 and fastened in place by a nut 94 on its threaded end. The door 90 slidably mounts the staple-driver 95 which is reciprocable in a slotted guideway 96 on its inner side (Fig. 9). The driver 95 has an enlarged rectangular head 98 at the top formed with a substantially square opening 99 and a narrower blade 100 extending downward from its head. The head 98 is adapted to slide in the upper widened portion of the slot in the rearward face of the door 90 and its blade portion 100 is grooved on both sides to adapt it to engage splines 101 on the sides of the narrower slot or guideway 96 in the lower part of the door through which the blade slides. The lower end of the blade 100 is beveled off on its forward side to form a narrower bottom face for engagement with the crossbar of a staple s (Fig. 8).

Friction control means for driver

As shown in this latter view, a slidable plunger 105 constructed of fiber is mounted in a transverse bore 106 in the lower portion of the head 98 with its forward end projecting through a hole 107 for engaging its end with the rearward face of the door 90. A helical spring 108 held in the main bore 106 by a plug or closure 109 in the end of the bore acts to slide the plunger. The plunger 105 is thus engaged frictionally with the rearward face of the door 90 to slightly resist the sliding action of the driver 95 for controlling its descent in the manner and for the purpose later explained. Seated against the bottom of the opening 99 in the head 98 of the driver 95 is a wear-plate 110 of hardened steel or the like for taking the thrust of the operating lever or beam, later described, during the driving stroke of the driver.

Door-latching means

The lower end of the door 90 (Figs. 13-15) is provided with cylindrical projections or trunnions 115 on its opposite sides for locking it in closed relationship at the front of the casing 2. For this purpose a tapering latch or locking member 120 rockably mounted on each side of the casing 2 and provided at its forward end with an inclined slot 121 is adapted to engage one of the trunnions 115 (Figs. 13 to 16). Each latch or locking member 120 is provided with a rectangular opening 122 in its wider rearward portion (Fig. 15) for receiving a rectangular member 123, the opposite flat sides of which engage the sides of the opening 122 to adapt it to slide therein.

The member or slide 123 is formed with a relatively large circular opening 124 for receiving the eccentric member 125 which is rotatable therein to move the slide 123 longitudinally of the latch or locking member 120. As shown in Figs. 15 and 16, the eccentric 125 is formed at one end with a square flange 126 abutting the side of the slider 123. The eccentric 125 is bored with a hole 127 disposed in offset or eccentric relation to its axis and adapted for rotatably mounting it on a stud 128. The stud 128 is formed with a guide-strip 129 abutting the inner face of the side plate 9 or 10, as the case may be, with its shank extending through a hole therein and the offset hole in the eccentric. A screw 130 passing through a washer 131 engages a tapped hole in the shank of the stud 128 to hold the parts in connected relationship. The member 123 with its large circular opening 124 thus serves as a bushing for the rotatable eccentric 125 and is rendered adjustable in the rectangular opening 122 by means of a set-screw 132 (Fig. 15) at the end of the latch 120. The set-screw 132 engages the interiorly-threaded hole 133 in the end of the latch 120 and has a small teat 134 at its end engageable with the flat end of the slide or bushing 123. A helical spring 135 held in a bore 136 in the latch 120 has its projecting end bearing against the opposite flat face on the bushing 123 to maintain its rearward end engaged with the teat 134 on the set-screw 132. By this construction the latch 120 may be minutely adjusted longitudinally of its mounting to position its slots 121 for engaging the trunnions 115 on the sides of the door 90, the spring 135 acting to provide a slight play in the latch and resilient pressure on the trunnions 115.

Latch-operating means

A yoke-shaped latch-operating lever 140 (Figs 13 and 14) having spaced arms 141 formed with square openings therein engaging the square flange 126 (Figs. 14-16) on the eccentric 125 to connect the operating lever 140 therewith for rotating the eccentric 125 to slide the latches 120 after they engage with the trunnions 115 on the door 90. In this manner the latch connection with the door is tightened for fixedly holding it in closed relationship. A cross-member or finger-rest 145 connects the outer ends of the arms 141 of the operating lever 140 to provide for manually operating it to lock and unlock the fastening means for the door 90. Each arm of the lever 140 carries a flat spring 146 comprising two thicknesses of tempered metal riveted to the inner sides of the arms at 147, extending angularly therefrom and bent around the under edges of the arms to continue upwardly in angular relationship toward the top. At this end of the spring the underlying strip is bent across the edge of the arm through a notch 148 to form a lug 149 projecting therebeyond for engagement with a longitudinally-extending groove 150 in the side of the latch 120. The lower edge of the latch 120 is chamfered to adapt the leg 149 to ride up onto its outer face. The lower edge of the groove 150 is inclined downwardly or beveled to adapt the end of the spring to slide outwardly therefrom for releasing it from the latch; while the upper edge of the groove is squared to adapt the end of the spring to engage positively therewith for swinging the latch upwardly in disengaging its slot 121 from its respective trunnion 115. In this way the operating lever 140 may be engaged with the latches 120 to rock them upwardly for releasing their slots 121 from the trunnions 115 as shown in Fig. 14 to unlock the door 90 for opening it. After the door 90 has been closed again the operating lever 140 may be swung downwardly to rock the latches 120 in the same direction for engaging their slots 121 with the trunnions 115 on the door 90 as more particularly explained hereinafter.

Slider with replaceable clinching anvil

Slidable vertically within the casing 2 and projecting downwardly therebelow is a bifurcated member 155, called for convenience the "slider," which mounts an anvil-support carrying a detachable clincher-block 175 (Figs. 9 and 10) at its forward end. The slider 155 is constructed with L-shaped members or legs 158 abutting the inner faces of the side plates 9 and 10 with the anvil-support 156 fastened between its legs 158 by means of transverse bolts 159 with nuts 160 threaded on the outer ends thereof. The slider 155 is guided at one side of its upper legs by strips 161 fastened to the inner faces of the plates 9 and 10 by screws 162 (Fig. 7) and held in location by dowel-pins 163 and 164 of different size. Below the guiding strips 161 are the lower strips 129 fastened to the side plates 9 and 10 but previously described as having the studs 128 formed as a part thereof and projecting through holes in the side plates; the studs being previously referred to as providing the pivotal mountings for the door-latches 120. A dowel-pin at the outer end of each strip 129 engages a hole in the side plate 9 for further supporting the strip 129. The strip 129 on the opposite side plate 9 is mounted and secured in place in the same manner as above described.

For guiding the opposite side of the upright arms of the slider 155 strips 166 are fastened to the inner face of the side plates 9 and 10 by screws 167 and held by dowel-pins 168 and 169.

Clincher-anvil

The anvil-support or mounting 156 is formed at its forward end with a re-entrant opening 170 extended rearwardly in a central narrower slot 171. The re-entrant opening in the anvil-support 156 is cut away on its under side to provide shouldered ledges 173.

A clincher-anvil 175 is of generally rectangular shape extended at the top on either side to form projections 176 adapted to overlie the top of the anvil-support 156 with shouldered portions 177 at the bottom adapted to engage the ledges 173 at the sides of the opening 170 in the anvil-support. When the nut 160 on the forward bolt 159 which fastens the anvil to the foot of the slider 155 is tightened it acts to draw the side portions of the support toward each other to bind the clincher-anvil 175 in place, the longitudinal slot 171 adapting the sides of the support to spring toward each other to act as jaws for this purpose.

Cam-shaped abutment

Mounted on the forward end of the baffle 5 is an upright abutment 180 in the form of a block secured in place by a pair of screws 181 projecting upwardly through the baffle 5 and single screws 182 at the sides projecting through the side plates 9 and 10. The rearward face 183 of the abutment 180 is of cam-shape extending upwardly in a relatively long arc and then inclined toward the left as viewed in Figs. 7 and 8; the cam-face 183 serving for a purpose later explained.

The upper ends of the legs of the slider 155 are thickened to provide square abutments 190 having relatively large transverse holes 191 therein for receiving a cross-pin 192 (Fig. 7) which connects the two legs of the slider 155. The pin 192 serves as the means for raising the slider 155 to elevate the clincher-anvil 175 and clamp the work against the under side of the nose at the front of the casing 2. Helical springs 193 encircling rods 194 slidable through vertical bores 195 in the abutments 190 at the upper end of the legs of the slider 155 tend to normally force the slider downwardly to space the clincher-anvil 175 below the bottom of the casing 2. The upper ends of the springs 193 bear against rectangular block-like heads on the ends of the rods 194 and the heads have projecting pins 196 engaging in holes 197 in the side plates 9 and 10 to anchor them for taking the thrust of the springs 193. Cross-pins 198 inserted through holes in the lower ends of the vertical rods 194 are slidable in slots 200 in the legs of the slider 155 and are adapted to engage the upper end of the slots to prevent the rods from being released from the bores 195.

Actuator for stapling and clinching means

The slider 155 and the staple-driver 95 are actuated by a rockable and displaceable beam 205, so-called, which is in the nature of a lever pivoted on the cross-pin 192, previously referred to as connecting the opposite legs of the slider. The beam 205 has an enlarged head 206 at its forward end and a tapering arm 207 extending rearwardly therefrom. The upper portion of the head 206 is hollowed out to form relatively thin side plates, and extending forwardly from its lower end is a lug 210 (Figs. 13 and 14) formed with a rounded enlargement at its end adapted to engage in the rectangular opening 99 in the head of the driver 95 (Figs. 2 and 7). Rearwardly of its head 206 the beam 205 is formed with an upwardly extending opening 211 having tapered sides which straddle the cam-shaped abutment 180 at the forward end of the wall or baffle 5 to adapt the beam to rock relatively thereto.

Slidable seal for pressure-chamber

Slidably mounted on the under side of the arm 207 of the beam 205 is a so-called vane 212 in the form of a flat plate carrying a sealing gasket and adapted to cooperate with the baffle 5 for providing a pressure chamber therebetween. The vane or plate 212 (Fig. 18) has upstanding flanges 213 at the sides formed with inwardly-projecting runners 214 slidable in grooves 215 extending the length of the arm 207. Between the bottom of the arm 207 and the top of the vane 212 is a flat strip of "nylon" or similar wear-resisting material formed with transverse slots 216 in which are mounted a series of small rollers 217. The rollers 217 provide a friction-reducing bearing between the top of the plate 212 and the bottom of the arm 207 whereby to allow free sliding movement of the vane 212 along the arm. The vane 212 has mounted on its under side a resilient gasket 218 of rubber or equivalent material, the inner end of which is adapted to slide along the camface 183 of the abutment or baffle 180 with its outer end traveling along the straight and arcuate faces of the rear wall 3 of the casing 2 (Figs. 7 and 8). The gasket 218 has a beveled rim 219 extending completely around its marginal portions and the elasticity of this rim adapts it to maintain a tight seal where it contacts the abutment 180, the wall 3 and the inner faces of the side plates 9 and 10. The gasket 218 is held in place on the under side of the vane 212 by a thinner plate 220 fastened thereto by screws 221.

Fluid pressure supply for operating implement

Compressed air or hydraulic fluid is supplied to the pressure-chamber between the wall or baffle 5 and the vane 212 on the beam 205 through transverse holes or channels 225 in the baffle having ports 226 (Fig. 7) leading upwardly therefrom into the chamber. The channels 225 have corresponding holes 230 and 231 leading through the side plates 9 and 10, those in the side plate 10 being closed at the end by a circular disk 235 (Figs. 3, 4 and 5) counterbored on its inner face to contain an annular gasket 236 seated against the outer face of the plate 10. The circular disk or washer 235 is clamped to the side plate 10 by a handle-member or grip 240 secured in place by an axial bolt 241 having its head seated in a counterbore 242 at the end of the handle and its threaded end screwed into the side of the baffle 5. A second handle-member 245 is mounted on the opposite side of the casing 2 (Fig. 1) extending longitudinally thereof in parallel relation thereto. The handle 245 has means at its end for connecting a hose 246 thereto, a tapered and threaded hole 247 receiving a nipple 248 which opens into a passage 249 communicating with a control-valve 250. The handle 245 is formed with a vertical post 251 flanged at its lower end to seat against the circular face of a tapered elbow-member 252 containing the airpassages for communication with the ports 226, previously described as opening into the pressure-chamber. The elbow-member 252 is fastened to the plate 9 on the side of the casing 2 by an axial bolt 253 (Fig. 6) having its head engaging a washer 254 abutting the outer end of said member with its threaded end screwed into the baffle 5.

The handle 245 is fastened to a boss 255 (Fig. 1) on top of the elbow-member 252 by similar means comprising an axial bolt 256 having its head engaging against a washer 258 abutting the top of the handle 245 and its threaded end screwed into a tapped hole in the member 252 at 259 (Fig. 5). The seated end of the elbow-member 252, and likewise the bottom of the handle 245, are recessed with counterbores 260 and 261, respectively, containing annular gaskets 262 for sealing the joints at these points.

Valve-means

At the end of the passage 249 in the handle 245 is a vertical bore 263 closed at the top by a screw-cap 264. The bore 263 communicates with a slightly smaller bore 265 therebelow forming a seat 266 for a plunger 267 having its head 268 adapted to close the opening therebetween. The valve-plunger 267 has a stem formed with a lower cylindrical portion or boss 269 which is slidable in a sleeve 270 of lesser internal diameter which lines the bore 265 with a still smaller bore 271 at its end opening through the bottom of the handle. The end of this portion of the valve-plunger 267 is beveled and adapted to be engaged by a spherical projection 272 on a trigger 275 which has spaced ears 276 pivoted on a pin 277 passing through a reduced portion of the under side of the handle 245. The above described valve-structure is similar in general to that described in United States patent application Serial No. 393,347 filed November 20, 1953, and issued as U. S. Letters Patent No. 2,714,208, on August 2, 1955, the trigger 275 being provided for sliding the plunger 267 upwardly to open the inlet-passage 249 of the valve and close its exhaust port. The inlet-passage 249 to the valve communicates with a horizontal duct 278 leading into a vertical bore 279 extending downwardly through the end of the post 251 of the handle 245. The bore 265 communicates with a duct 280 in its side opening into an exhaust passage 282 which leads to the end of the handle 245 for communication with the atmosphere.

Referring now to Figs. 1, 5 and 6, the vertical bore 279 in the post 251 opens into the recess 260 at the end of the post to communicate through channels or ducts 290 and 291 leading into an axial bore 292 in the member 252. The horizontal bore 292 is continued toward the right as shown in Fig. 5 in a larger bore 294 for receiving a slidable closure-member 295 of cylindrical construction closed at one end in the manner of a thimble. Surrounding the bolt 253 in the smaller bore 292 is a sleeve 296, one end of which abuts the end of this bore with its opposite end serving as a stop for limiting the sliding movement of the closure 295. An annular gasket 297 held in a groove in the closed end of the closure 295 serves to seal its end with the bolt 253. A relatively light helical spring 300 surrounding the bolt 253 has one end bearing against the closed end of the closure with its opposite end held by a washer 301 on the bolt abutting the side of the plate 9. The spring 300 tends to slide the closure-member 295 toward the left as shown in Fig. 5 to maintain it in engagement with the end of the sleeve 296. An annular groove 302 in the larger bore 294 communicates with four drilled holes or ducts 303 extending from the recess 261 in the end of the member 252 in parallel relation to its axial bore. A second annular groove 304 spaced from the groove 302 also communicates with the four holes 303. Extending radially outward from the larger bore 294 in the member 252 are four holes 305 which open to the atmosphere on the outside of said member. The method of operation of the relief valve above described is explained in detail in connection with the operation of the complete machine.

Actuator springs

Beneath the wall 4 of the casing 2 a pair of relatively heavy springs 310 (Figs. 7 and 8) are mounted on telescopic members 311, each comprising a tubular part 312 and a rod 313 slidable therein. The upper end of the tubular part 312 of each member 311 is connected to a yoke 314 by being forced onto a knurled stem 315 on the forward end of the yoke. The yoke 314 is pivotally connected to an eye-bolt 316 extending through a hole in the wall 4 by a cross-pin 317; the eye-bolt 316 being held in the wall by a nut 318. The larger portion of the stem 315 on the yoke 314 is scored with helical grooves 319 for receiving the end coils of the spring 310 to anchor it at this end. The lower end of the rod 313 is formed with a head 320 fastened to the side of the head 206 of the beam 205 by a cross-pin 321 which also secures the head of the rod 313 on the opposite side of the beam. The head 320 of the rod 313 is formed with a cylindrical extension 322 scored with helical grooves 323 for receiving the end coils of the spring 310 to anchor the lower end of the spring. The springs 310 are caused to expand and contract to a slight extent as the beam 205 swings from the position shown by dotted lines in Fig. 2, to that illustrated by full lines in Fig. 8, with the rods 313 sliding within the tubular members 311 during this motion of the beam. The springs 310 have the function to resist movement of the beam 205 for building up pressure in the air-chamber whereby to first lift the slider 155 and then pivot the beam for actuating the staple-driver 95 in a driving stroke. Upon release of pressure in the air-chamber the springs 310 will pivot the beam 205 clockwise to return it to inoperative position (Fig. 2).

Buffer for beam

A shock-absorber or buffer is provided for taking the thrust of the beam 205 as its arm 207 is forced upwardly by the pressure in the chamber. An arm or lever 325 has its rearward angular portion pivoted in a slot 326 in the upper end of the wall 3 of the casing 2 by means of a cross-pin 327. The forward end of the arm 325 is connected to a stud 328 having its lower flatted end fastened in a slot in the wall 4 by a cross-pin 330. A bumper 331 of rubber or like resilient material is mounted on the upper end of the stud 328 above the end of the arm 325 with a nut 332 and lock-washer 333 beneath the nut bearing against a second washer 334 on top of the bumper. An adjustable stud 335 threaded through a hole in the arm 325 adjacent its pivoted end projects therebelow through an enlarged opening in the wall 4 of the casing. A nut 336 and lock-washer 337 on the upper end of the stud provides means for adjusting it axially in the arm 325 to locate its lower end in position to be engaged by the end of the arm 207 of the beam 205 so as to relieve the shock during this action when the beam is swung up forcibly, for example when driving staples through relatively soft compressible metal or fiberboard.

Method of operation

To prepare the implement for operation the magazine 15 is loaded with staples by opening the door 90 at the front of the casing 2. Normally, the door 90 is locked in closed relationship by the engagement of its trunnions 115 in the slots 121 of the latches 120 (Figs. 1 and 15). At this juncture the operating lever 140 has been swung back as shown in Fig. 15 with its cross-member 145 abutting the under side of the casing 2. To release the latches 129 the lever 140 is swung clockwise to cause the lugs 149 at the ends of the springs 146 to ride upwardly across the outer faces of the latches 120 and engage in the grooves 150. Further upward swinging movement of the lever 140 will then act to pivot the latches 120 upwardly and release the trunnions 115 from the slots 121 in the latches (Fig. 14).

Usually, the staples s are packaged by cementing them together in "sticks" or refill cartridges which may be readily slid into the forward open end of the magazine 15 to straddle them on the core 40 (Fig. 4); the pusher 70 thus being pushed rearwardly against the tension of the spring 71. As the staples are slid onto the core 40 they ride under the retainer-pawl 80 (Fig. 17) to rock its toe 82 upwardly and adapt it to function in the manner of a ratchet for preventing ejection of the staples from the magazine when the door is opened. After the magazine has been loaded the door 90 may be closed by swinging it downwardly and locked by pivoting the lever 140 counterclockwise to engage the latches 120 with the trunnions 115. After the latches 120 have been thus engaged the pivoting of the lever 140 is continued whereby to cause the lugs 149 on the springs 146 to lift out of the grooves 150 by riding on the beveled edges thereof. The lever 140 may then be swung into its rearward position shown in Fig. 15 with its cross-member 145 abutting the under side of the casing 2. This operation of the lever 120 rotates the flanged eccentrics 125 for sliding the slides 123 rearwardly to thereby act against the set-screws 132 for tightening the latches 120 and holding the door 90 closed snugly against the front of the casing 2.

The implement is connected to a suitable source of fluid pressure, such as compressed air, by means of the hose 246 attached to the handle 245 by the nipple 248 (Fig. 1). Normally, the valve 250 is closed with the head 268 of the plunger 267 engaging the seat 266 (Fig. 1) by the pressure entering the bore 263 from the passage 249. The implement is applied to use by holding it with the operator's hands grasping the grip 240 on one side and the handle 245 on the opposite side. It may be operated by first entering the work W (Fig. 7) between the nose on the casing 2 and the anvil-block 175 to locate the staple-driver 90 at the point where a staple is to be inserted. The trigger 275 is then pressed by the forefinger reaching under the handle 245 to slide the plunger 267 upwardly for opening the valve 250. In this way pressure is admitted through the duct 278 to the vertical channel 279 (Fig. 5) in the post 251 of the handle 245, whence it will enter the recess 260 to feed through the ducts 290 and 291. The pressure thence passes into the horizontal bore or chamber 292 to act against the closed end of the closure 295 for sliding it toward the right against the tension of the spring 300. Displacement of the closure 295 (Fig. 6) opens the end of the duct 291 to admit pressure to the bore or chamber 294, whence it enters the annular groove 302 which communicates with the horizontal ducts or channels 303. From the channels 303 the pressure feeds into the recess 261 in the end of the member 252 and enters the horizontal channels 225 whence it passes upwardly through the ducts 226 into the pressure chamber beneath the vane 212.

Pressure building up in the chamber beneath the vane 212 accumulates first toward its forward end (Fig. 7) and thereby starts to raise the beam 205 bodily to lift the slider 155. At this juncture the projection 210 at the forward end of the head 206 of the beam 205, due to its engagement with the upper end of the slot 99 in the head 98 of the driver 95 forces the upper end of the driver against the sleeve 92 on the cross-pin 93 to thereby provide a fulcrum for the forward end of the beam 205. The beam 205 will then start to rock upwardly as it pivots on the pin 192.

Continued pressure against the vane 212 on the under side of the beam 205 causes it to hold the slider 155 raised with the clincher-block 175 pressing against the under side of the work W to clamp it fixedly against the nose on the casing 2. As the beam 205 swings upwardly the vane 212 slides outwardly along the under side of its arm 207 with the inner end of the gasket 218 bearing against the cam-face on the abutment 180 to maintain its opposite end pressed firmly against the inner face of the arcuate portion of the end wall 3 of the casing. The rim of the gasket 218 is thus caused to maintain a tight seal at both ends of the vane 212 and also at its sides along the inner faces of the plates 9 and 10. It will be understood that after the slider 155 has reached the end of its upward lift, the continued pressure on the vane 212 will rock the head end of the beam 205 downwardly to cause its projection 210 to slide the driver 95 downwardly with maximum force for driving a staple s through the work W. As the driver 95 descends in the grooves in the rearward face of the door 90 the staple s supported on the supporter 45 is engaged thereby to slide it down the forward inclined beveled face thereof as the supporter is retracted in the magazine 15 against the pressure of the springs 48, 49 and 50. As the legs of the staple s are driven through the work W they enter the grooves in the clincher-anvil 175 and are bent thereby to clinch them against the under side of the work.

During the continued movement of the beam 205 as above explained the springs 310 on the members 311 contract or expand as occasion requires to adjust their pivotal connection at 321 to the varying displacement of the beam. Should the beam 205 swing upwardly beyond its normal range due to the driver 90 penetrating sufficiently in the work to embed the head of the staple, for example during stapling fiber parts, then its arm 207 will strike against the end of the adjustable bolt 335, thereby tending to rock the arm 325 upwardly on its pivot 327. Under this action the resilient bumper 331 will yield to cushion the shock and thus prevent damage to the operating parts of the implement.

Upon completion of the operation for driving and clinching a staple the trigger 275 on the handle 245 is released to cause the valve 250 to be closed by the pressure in the bore or chamber 263 acting on the head 268 of the plunger 267 so that the operating parts may be returned to initial relationship. As the plunger 267 is depressed to seat its head 268 (Fig. 1) its boss 271 will open the duct 280 leading to the exhaust passage 282 and the pressure will escape from the chamber in the casing 2 in the manner as next explained. The air will escape from the pressure chamber through the ducts 226 (Fig. 5), thence through the passages 225 to the recess 261 at the end of the member 252 and into the bores 303 leading to the grooves 304. At this point the spring 300 will have slid the closure-thimble 295 rearwardly into the position shown in Fig. 5 with its closed end abutting the end of the sleeve 296 in the bore 292. By this action the inlet groove 302 is closed and the groove 304 opened so that pressure will escape into the bore 294 and thence exhaust outwardly to the atmosphere through the radial holes or passages 305.

Upon relief of the pressure in the chamber the beam 205 will be caused to swing downwardly under the force of the two springs 310 connected to the head of the beam at 321 to assume the position indicated by dotted lines in Fig. 2. The descent of the beam 205 will cause the slider 155 to be slid downwardly under the action of the springs 193 so as to release the clincher-anvil 175 for removing the work W from the implement. Coincidently with the descent of the slider 155 the rocking of the beam 205 on its pivot 192 will cause its projecting lug 210 to swing upwardly to return the driver 95 to its initial relationship shown in Fig. 2.

From the above description it will be observed that the present improved implement may be conveniently transported to the work, or held in position for the work to be applied thereto, and the staple driving and clinching operations performed automatically by the simple manipulation of the trigger for actuating the pressure-valve.

While the improved device is herein shown and described as embodied in a preferred form of construction, it is to be understood that modifications may be made in the structure and relationship of its parts without departing from the spirit or scope of the invention. Therefore, without limiting myself in this respect, I claim:

1. In a stapling machine having a casing, a staple-driver therein for driving staples, a magazine for containing a supply of staples, and means for feeding the staples to said driver; the combination of an anvil movably mounted on the casing to clamp the work against said casing, a single member connected to said anvil to move it for clamping the work and connected to said driver for moving it to drive a staple thereinto, a chamber for fluid pressure in said casing, and manually-operable means on said casing for releasing said fluid pressure to actuate said member to initially operate said anvil and thereafter operate said staple-driver.

2. A machine in accordance with claim 1 having the casing provided with handles projecting from its sides, one of said handles being hollow to provide an air passage communicating with the chamber in said casing, an air-valve in said handle for closing said passage, and a trigger mounted on the handle and connected to said valve for manually operating it.

3. In a stapling machine having a casing with a driver reciprocable therein, and means for feeding staples to said driver; the combination of an anvil mounted on the casing for movement relatively thereto to clamp the work in position to be stapled, a single actuator slidable in said casing and connected to said anvil to move it for clamping the work thereagainst and also connected to the staple-driver for activating it, a pressure-chamber within said casing, and valve-means on said casing for supplying fluid pressure to said chamber for operating said actuator to move the anvil toward the casing and actuate the staple-driver to drive a staple into the work.

4. In a stapling implement having a casing with a staple-driver reciprocable therein and means for feeding staples to said driver; the combination therewith of an anvil movably mounted on the casing for clamping the work against said casing, a single actuator movably mounted in the casing and connected to said anvil for moving it toward said casing and also connected to said staple-driver for reciprocating it, a pressure-chamber within said casing, a valve on the casing for admitting fluid pressure to said chamber to operate the actuator, and manually-operable means for opening said valve.

5. In a stapling machine having a casing, a reciprocable staple-driver in said casing and means for feeding staples to said driver; the combination therewith of an anvil mounted on the casing to move toward said casing to clamp the work thereagainst, a chamber for fluid pressure within the casing, an actuator movable within the casing by the fluid pressure in said chamber, means connecting said actuator to said anvil for moving it toward said casing, means connecting said actuator to the staple-driver for reciprocating it, valve-means on the casing for supplying fluid pressure to said chamber in the casing, and means for operating said valve-means.

6. In a stapling machine having a casing, a staple-driver reciprocable in said casing, an anvil mounted on said casing to move relatively thereto, a fluid pressure-chamber in said casing, an actuator within said casing movable by fluid pressure in said chamber, means connecting said actuator to the anvil for moving it toward the casing, means connecting the actuator to the staple-driver for reciprocating it after the anvil has been moved toward the casing to grip the work thereagainst, and valve-means on the casing for admitting fluid pressure to the chamber for operating said actuator.

7. In a portable stapling implement, a flat-sided casing having handles projecting therefrom, a staple-driver slidable at the forward end of said casing, a magazine on the casing for containing a supply of staples, means for feeding the staples to said driver, an anvil movably mounted on the casing to move toward said casing, a pressure-chamber within said casing, an actuator movable in the casing and connected to the anvil for moving it toward the casing to clamp the work therebetween and also connected to the driver to slide it for driving staples into the work, means connected to the casing to supply fluid pressure to the chamber in said casing, and valve-means for admitting fluid pressure to the chamber for operating the actuator to move the anvil and actuate the staple-driver.

8. In a portable stapling implement, a casing, handles mounted on said casing for applying it to use, an anvil mounted on the casing to move relatively to said casing to clamp the work thereagainst, a staple-driver reciprocable in the casing, a fluid pressure-chamber in said casing, an actuator movable in said casing and operable by the fluid pressure in said chamber, means connecting said actuator to the anvil to move it toward the casing, means connecting the actuator to the staple-driver for reciprocating it, and manually-operable valve-means on the casing for admitting fluid pressure to the chamber.

9. In a stapling machine having a casing, a staple-driver slidable on said casing, an anvil mounted on said casing to move relatively thereto, a fluid pressure-chamber in said casing, an actuator movably mounted within said casing and operable by fluid pressure in said chamber to move the anvil toward the casing for clamping the work thereagainst, said actuator also connected to the staple-driver for operating it to drive a staple into the work, and means connected to the casing to supply fluid pressure to said chamber for operating the actuator.

10. In a stapling implement having a casing, a staple-driver slidable in said casing, an anvil mounted on said casing to move relatively thereto for gripping the work thereagainst, a fluid pressure-chamber in said casing, an actuator movably supported in said casing for operation by fluid pressure in said chamber, means connecting said actuator to the anvil for moving it towards the casing, means connecting the actuator to the staple-driver for operating it after the anvil has gripped the work, and valve-means on the casing for admitting fluid pressure to the chamber therein to operate said actuator.

11. In a stapling machine, a casing having a fluid pressure-chamber therein, a staple-driver slidably mounted on the forward end of said casing, an anvil movably mounted on said casing to suspend it therebelow, an actuator beam movably mounted in said casing for operation by the pressure in said chamber, means connecting said actuator to the anvil to draw it upwardly to grip the work against the under side of the casing, means for mounting said actuator to pivot in said casing, and means connecting said actuator to the staple-driver for sliding it to drive a staple into the work during the pivotal movement of said actuator.

12. In a stapling machine, a casing, a staple-driver slidably mounted on said casing for driving the staples into the work, an anvil slidably mounted on the casing to depend therefrom, an actuator beam pivotally connected to said slidable anvil and also connected to said staple-driver for sliding it, and means connected to the casing for supplying fluid pressure to the chamber in the casing to cause it to move the actuator upwardly for raising the anvil to clamp the work against the under side of the casing said actuator being rockable about its pivot after raising the anvil to slide the staple-driver downwardly for driving the staples through the work.

13. In a stapling machine having a casing with a fluid pressure-chamber therein, a staple-driver slidably mounted on the forward end of said casing, an anvil supported beneath the casing by means slidably mounted within the casing for raising and lowering said anvil relatively thereto, an actuator beam pivotally connected to the slidable mounting means for the anvil, means at one end of said beam connected to said staple-driver for sliding it, means connected to the casing for admitting fluid pressure to the chamber in the casing for initially pivoting said actuator to draw the anvil toward the casing to clamp the work thereagainst and to thereafter pivot said actuator to slide the staple-driver to drive a staple into the work.

14. In a stapling implement comprising a casing, a staple-driver slidably mounted on the forward end of said casing, an anvil-support normally depending below the casing, a clincher-anvil carried by said support, means slidable within the casing and connected to said anvil-support to move it towards the casing for clamping the work thereagainst, an actuator beam pivoted to said slidable means and carrying a vane constituting the upper wall of a pressure-chamber, said pivot means connecting the actuator to the anvil-support to raise it, means connecting the actuator to the staple-driver to slide it for driving a staple into the work held on the anvil, and means on the casing for admitting pressure beneath the vane on said actuator to move the latter for raising the anvil and thereafter causing it to pivot for operating the staple-driver.

15. In a stapling machine, a casing provided with a baffle extending thereacross and forming the bottom wall of a pressure-chamber therein, a staple-driver slidably mounted on the forward end of said casing, an anvil supported below said casing by means slidable therein to raise it toward the casing, an actuator beam pivoted to said slidable supporting means for the anvil and having a vane mounted on said actuator in position overlying the baffle to form a pressure-chamber therebetween, means connecting the actuator to said staple-driver for sliding it, and valve-means on said casing for admitting fluid pressure to said chamber to cause it to act against the vane on said actuator to move the latter upwardly for raising the anvil to clamp the work against the casing and to thereafter pivot said actuator to slide the staple-driver downwardly to drive a staple into the work held on the anvil.

16. In a stapling machine, a casing having a baffle extending longitudinally therein and forming the bottom wall of a pressure-chamber, an anvil having means for supporting it below the casing, said means being slidable within the casing to raise the anvil for clamping the work against the under side of the casing, an actuator beam pivoted to said slidable means for supporting said anvil and extending rearwardly therefrom, a vane on the underside of said actuator positioned above said baffle for forming a pressure-chamber therebetween, means connecting the forward end of said actuator to said driver to slide it for driving a staple through the work held on said anvil, resilient means connected to said actuator for controlling its movement under the pressure acting against said vane on its under side, valve-means on the casing for admitting fluid pressure to said chamber to move the actuator for raising the anvil and thereafter causing it to pivot to slide the staple-driver for driving a staple into the work, and means carried by said vane to seal its marginal edges against the walls of said casing to prevent escape of the pressure acting thereagainst for operating the actuator.

17. In a portable stapling implement having a casing provided with handles thereon projecting from its sides, a baffle extending longitudinally within said casing to form the bottom wall of a pressure-chamber, a staple-driver slidably mounted at the forward end of said casing, an anvil suspended below the bottom of said casing by means slidable therewithin, an actuator beam pivoted to the slidable means for said anvil, said beam having its forward end connected to the staple-driver for sliding it to drive a staple through the work held on the anvil, a vane slidably mounted on the under side of said actuator and positioned to cooperate with the baffle to form a fluid pressure-chamber therebetween, valve-means on the casing for admitting fluid pressure into the chamber to act against the vane on said actuator for moving it upwardly to raise the anvil and clamp the work against the under side of casing, means in the casing connected to the actuator to limit the upward movement of said actuator to cause it to rock about its pivot for sliding the staple-driver downwardly to drive a staple into the work, and means connected to the casing for supplying fluid pressure to said chamber for operating said actuator.

18. A machine in accordance with claim 17 having resilient means held in the casing and connected to the anvil for forcing it downwardly away from the bottom of said casing, said resilient means being yieldable as the actuator raises said anvil to clamp the work against the under side of the casing.

19. A machine in accordance with claim 17 in which said casing is provided with an arcuate rearward wall and a cam-shaped abutment at the forward end of the baffle, said slidable vane on the actuator provided with a gasket having a flexible rim, the forward end of said gasket on said vane being adapted to travel on the cam-face of the abutment to cause it to slide with its opposite end traveling the arcuate surface of the rearward wall for forming a seal to prevent escape of the pressure from said chamber in the casing.

20. In a stapling implement, a casing having upper and lower inclined walls, a vertical front wall and an arcuately-shaped rearward wall, with spaced side walls forming a complete enclosure, a driver slidably mounted in the front wall of said casing, an anvil mounted below said casing by means slidable therewithin, an actuator beam pivoted at its forward end to the slidable means for said anvil and extending rearwardly therebeyond in an arm, a vane on the under side of said arm cooperating with said lower wall and said side walls to form the upper wall of a pressure-chamber in the casing, an upstanding abutment in the casing having a cam-shaped face spaced forwardly from the rearward wall of the casing, said vane slidably mounted on said rearward arm of the actuator, means for sealing the marginal portions of said vane with the cam-shaped face of said abutment, the rearward wall and side walls of the casing to prevent escape of air from the pressure-chamber, means at the forward end of said actuator connecting it to the staple-driver for sliding it, and valve-means on the casing for admitting compressed air to the pressure-chamber to cause it to act against the vane on the actuator for raising it to draw the anvil upwardly to clamp the work beneath the casing and to thereafter rock about its pivot for sliding said staple-driver to drive a staple through the work held on the anvil.

References Cited in the file of this patent
UNITED STATES PATENTS
2,687,522    Juilfs  ------------------ Aug. 31, 1954